United States Patent [19]
Ahlstone

[11] 4,133,558
[45] Jan. 9, 1979

[54] MISALIGNMENT PIPE CONNECTOR

[75] Inventor: Arthur G. Ahlstone, Ventura, Calif.

[73] Assignee: Vetco, Inc., Ventura, Calif.

[21] Appl. No.: 823,918

[22] Filed: Aug. 12, 1977

[51] Int. Cl.² ............................................. F16L 27/06
[52] U.S. Cl. ........................................ 285/39; 285/167;
285/263; 285/309; 285/379
[58] Field of Search ................. 285/39, 18, 334.2, 263,
285/309, 310, 167, 379, 380, 93; 29/237, 446

[56] References Cited

U.S. PATENT DOCUMENTS

| | | | |
|---|---|---|---|
| 275,098 | 4/1883 | Walker | 285/363 X |
| 1,681,729 | 8/1928 | Gold et al. | 285/379 X |
| 2,866,370 | 12/1958 | Biach | 285/39 X |
| 3,321,217 | 5/1967 | Ahlstone | 285/379 X |
| 3,466,738 | 9/1969 | Mount | 29/237 X |
| 3,492,027 | 1/1970 | Herring | 285/315 X |
| 3,628,812 | 12/1971 | Larralde | 285/322 X |
| 3,675,713 | 7/1972 | Watkins | 285/18 X |
| 3,717,920 | 2/1973 | Oliver et al. | 285/DIG. 21 X |
| 4,012,059 | 3/1977 | Luke et al. | 285/18 |
| 4,068,868 | 1/1978 | Ohrt | 285/223 X |

FOREIGN PATENT DOCUMENTS 449350  4/1968  Switzerland ............................. 285/263

*Primary Examiner*—Thomas F. Callaghan
*Attorney, Agent, or Firm*—Bernard Kriegel; Philip Subkow; Newton H. Lee, Jr.

[57] ABSTRACT

A misalignment connector for large pipelines includes an internal, metal seal ring having an external spherical surface which is axially and circumferentially loaded between opposed internal spherical metal surfaces of pipe connector hubs having parts engaged with holding means having spherical surfaces enabling the connector to be made up with the pipe connector hubs disposed over a range of angular misalignment and with the sealing ring loaded axially and inwardly when the connector body parts are secured together by the holding means to prevent relaxation of the preload on the sealing ring. The metal sealing ring is initially supported on one of the hubs by means enabling relative angular motion of the sealing ring as it is loaded between misaligned hubs. The hubs are provided with thrust surfaces enabling them to be initially preloaded against the sealing ring by a loading tool.

18 Claims, 6 Drawing Figures

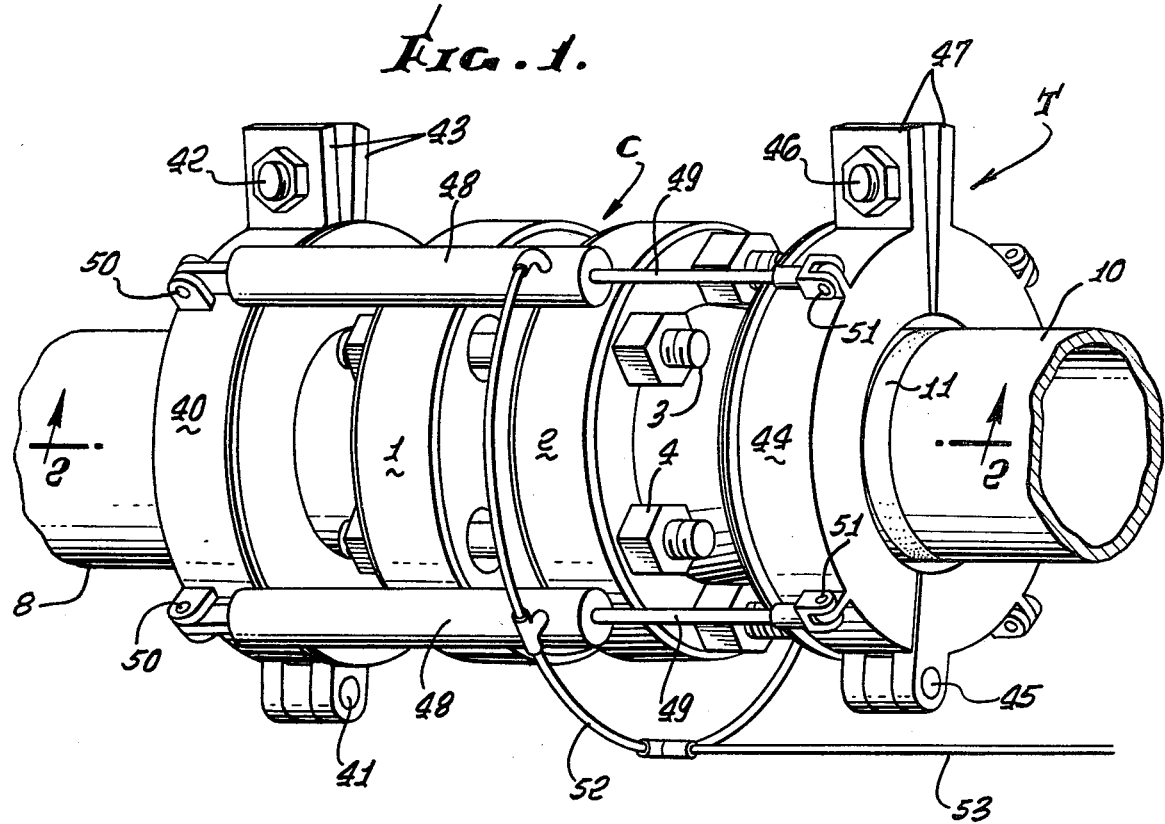
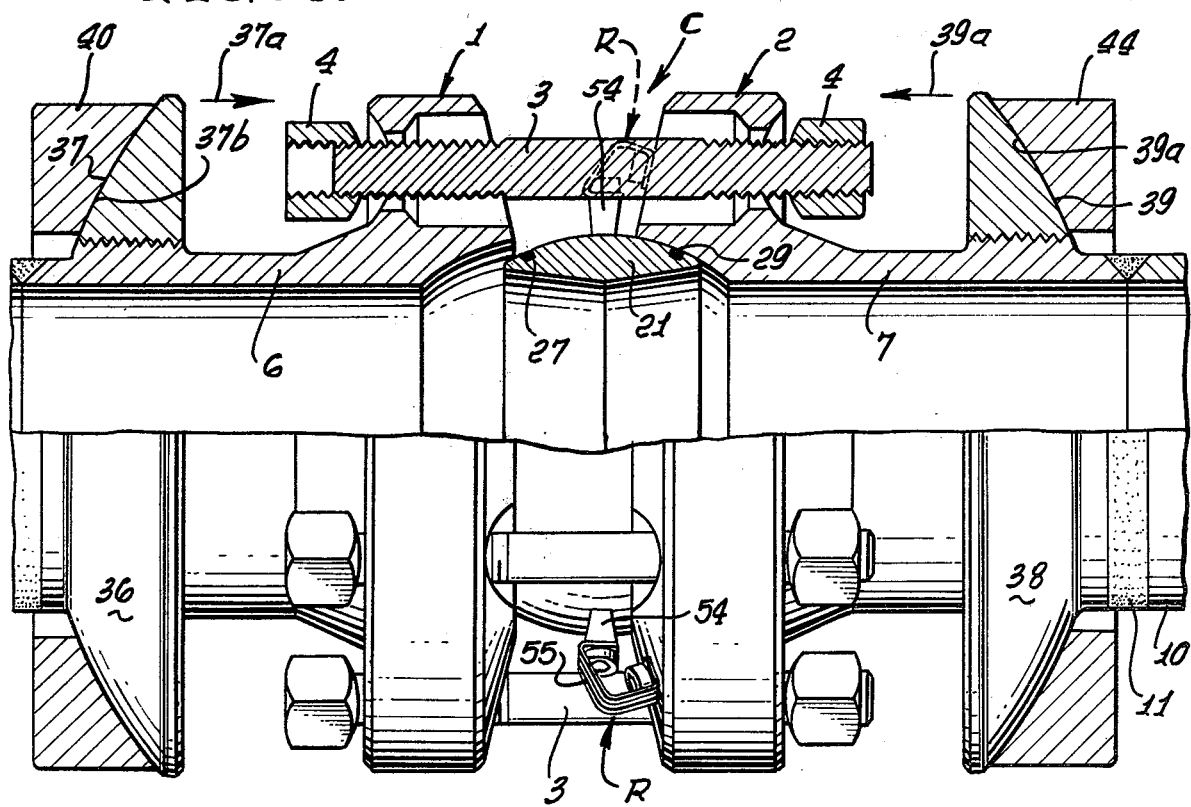

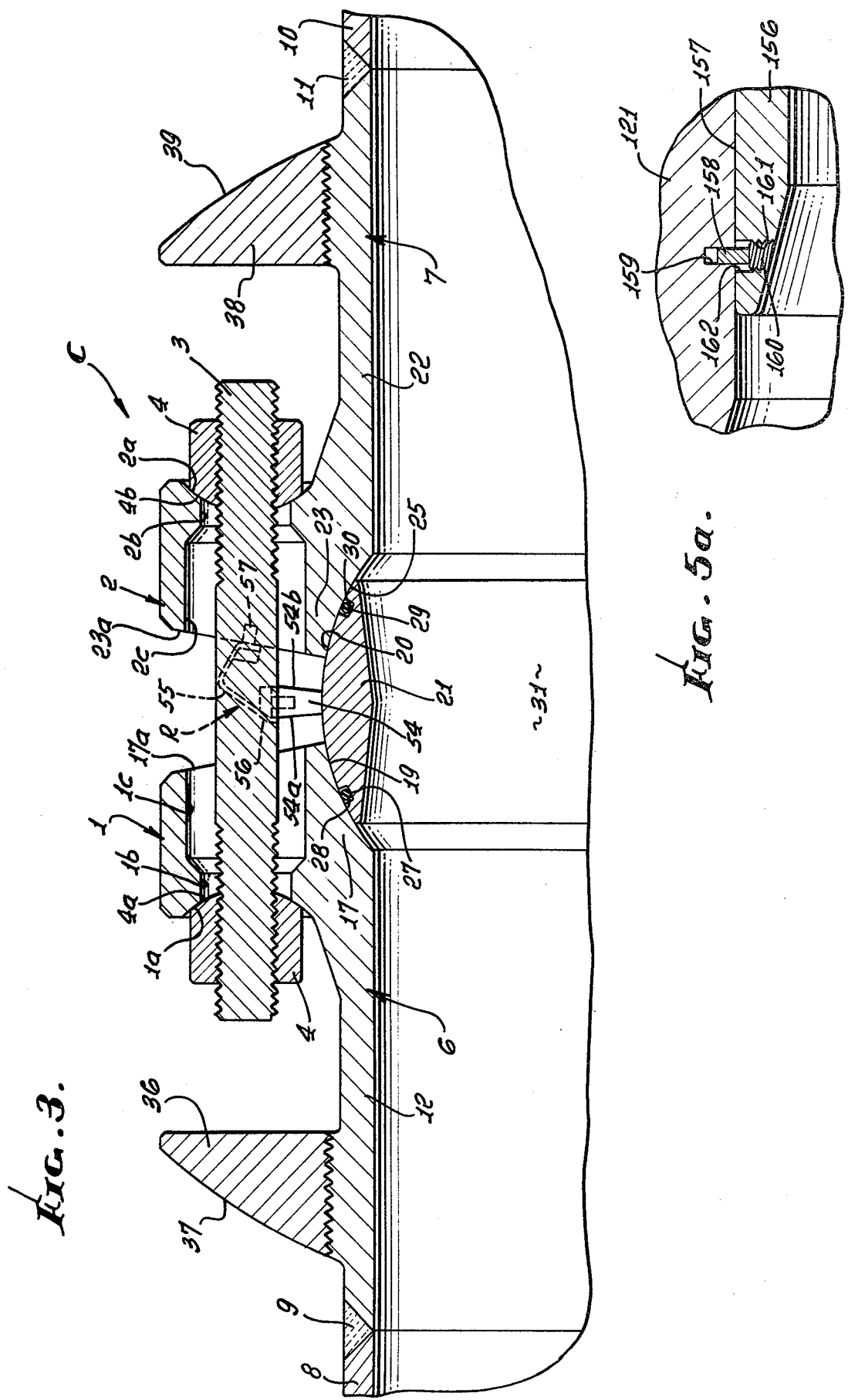

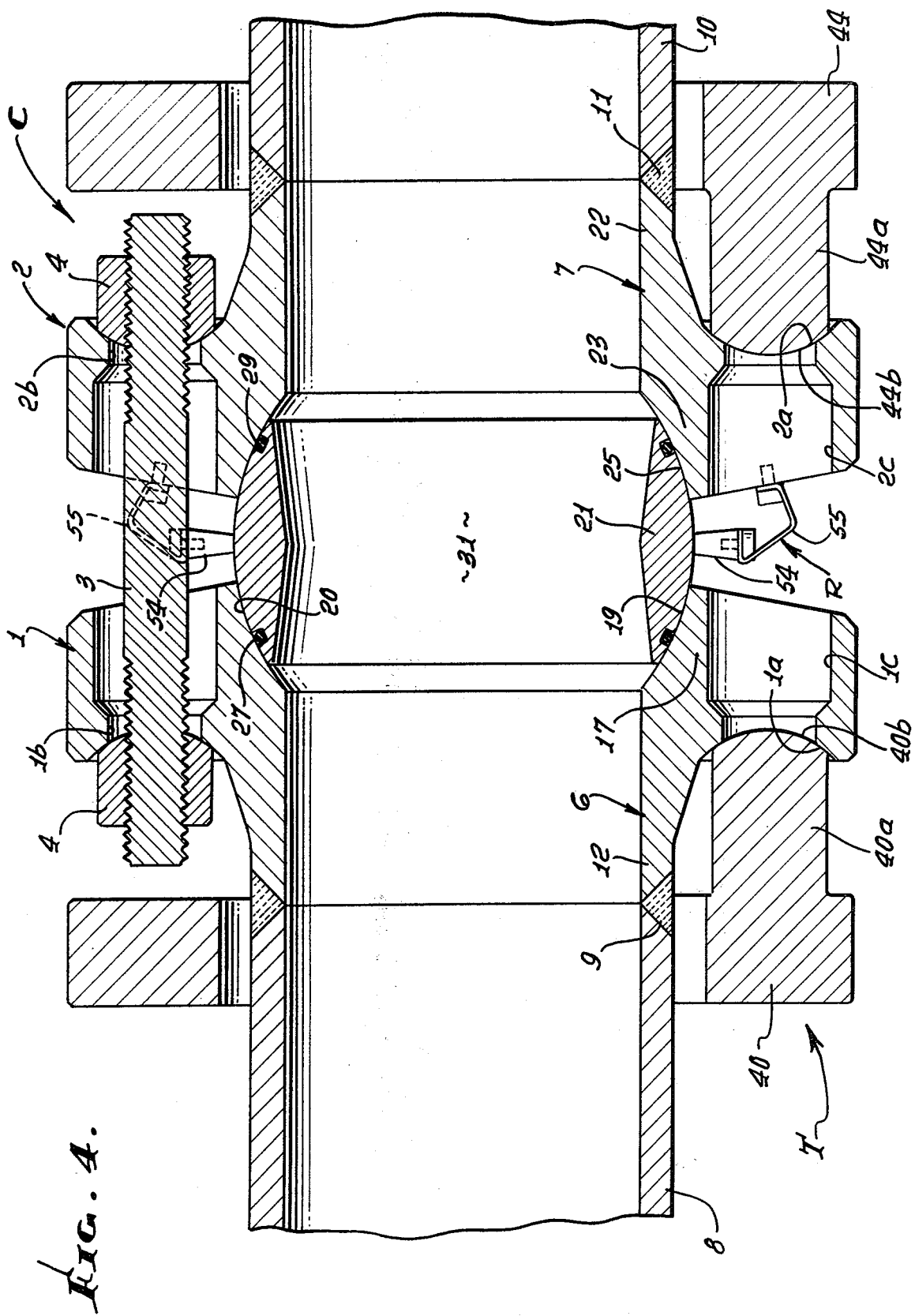

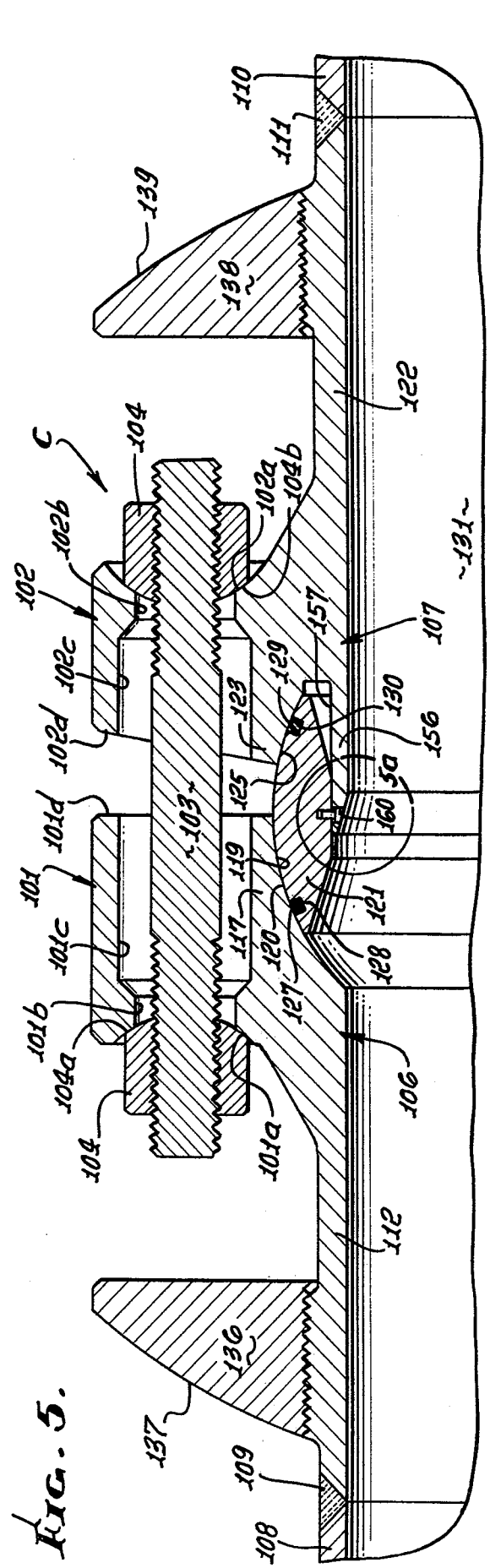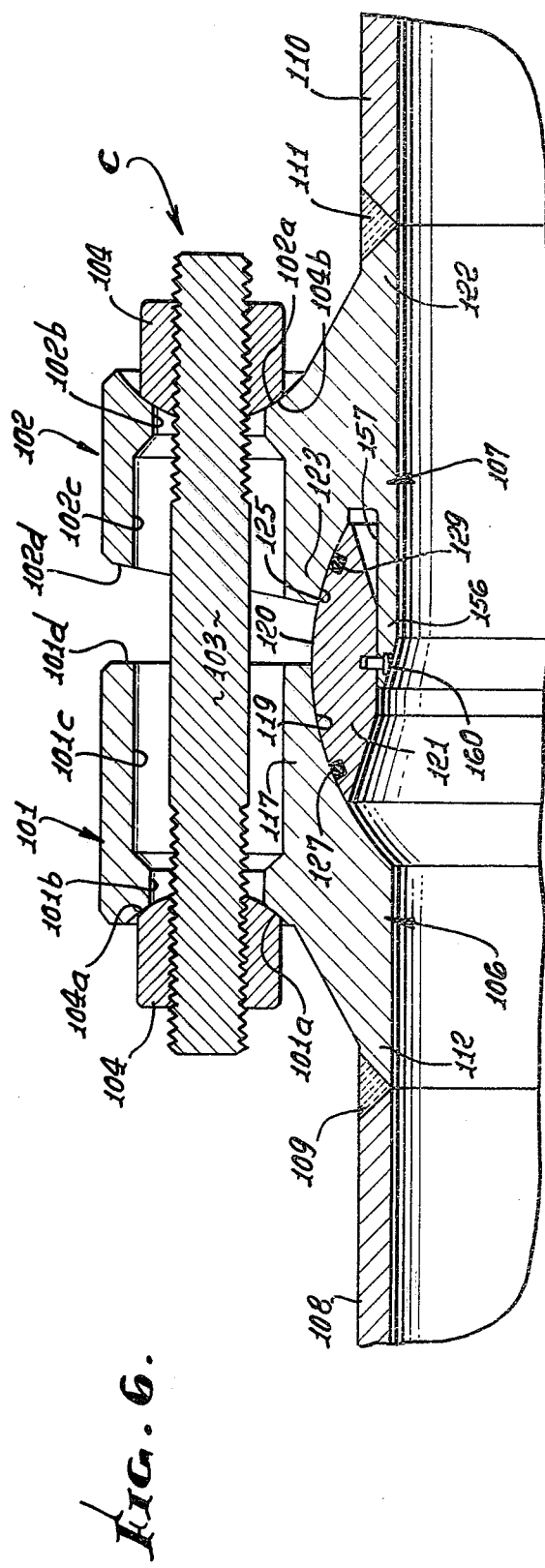

MISALIGNMENT PIPE CONNECTOR

The offshore oil and gas industry has been, and is, more generally adopting the practice of utilizing large subsea pipe lines for gathering and transporting production from wells completed on the floor of the sea at substantial depths. A pipeline may be damaged and require repair in such a subsea environment. A typical repair may involve the very costly installation of a connector which can be made up between pipe sections which are misaligned over a range of angles rendering the make up of flange connections very difficult. On the other hand, in some pipeline systems, regular flanged connectors are used where misaligned connectors would be advantageous and would simplify the make up of connections, even where the pipe is only slightly misaligned.

Such operations performed in a subsea environment by divers with special equipment are very difficult, at best, and as the depth of such pipelines increases, requiring the use of diving bells with manipulative tools for remote makeup, the problems are even more difficult and costly.

Ball and socket connectors for pipe are notorious, wherein a range of angular misalignment between the connector parts can be tolerated, but such connectors, for use in subsea pipelines are extremely costly to manufacture and install in the subsea environment. Moreover, when such connectors are of the typical ball and socket type, the seal diameter is quite large requiring very large constraining means to maintain the ball member sealingly engaged in the socket member. The constraining means may also be very difficult to make up sufficiently to provide good tensile and compressive strength in the connector. Such problems are generally not present in various smaller misalignment connectors used in more conventional applications, in pipe which is not subjected to axial loading of any consequence, and wherein freedom to swivel may be desired. Elastomeric or flexible sealing means have also been employed in some ball type or misalignment connectors, but elastomeric or flexible sealing material is not reliable as a seal over a long period of time, as compared with a metal-to-metal seal, or a metal-to-metal seal with an elastomeric flexible backup seal. Where means have been provided for loading the ball and socket members together in subsea misalignment connectors using hydraulic means, the hydraulic equipment, as well as the connectors, have been very elaborate and costly. Elaborate structures have also been provided for eliminating the problem of misalignment of the pipe otherwise than in the connector itself.

Examples of misalignment pipe or fluid line connectors for subsea use and methods for handling pipeline repairs are shown and described in the following U.S. Pat. Nos.:
    3,658,366 — Apr. 25, 1972 — Welch, Jr.
    3,737,179 — June 5, 1973 — White, Jr.
    3,780,421 — Dec. 25, 1973 — White, Jr., et al.
    3,997,197 — Dec. 14, 1976 — Marsh et al.

Examples of misalignment pipe or fluid line connectors for other uses are shown and described in the following U.S. Pat. Nos.:
    3,712,645 — Jan. 23, 1973 — Herter
    3,848,899 — Nov. 19, 1974 — Smith The present invention relates to an improved misalignment connector, particularly suited for use in subsea pipeline connections, which is of a simple construction and which is easy to make up, yet is efficient in its sealing action.

An object of the invention is to provide such a misalignment connector which can be simply made up on shore, or on a vessel above water, as well as beneath the water by a diver or manipulator using simple tools.

Another object is to provide a misalignment connector having a metal seal ring with an external spherical surface sealingly loaded between opposed spherical metal surfaces of connector hubs, including a resilient backup seal between the metal sealing faces.

More particularly the invention provides a misalignment connector in which an internal metal sealing ring has a spherical outer surface engaged by opposing spherical surfaces on connector hubs on the connector ends or pipe ends and preloaded or energized axially and circumferentially inward to provide a metal-to-metal seal, the seal ring being further pressure loaded by fluid in the connector, the hubs being held in position loading the sealing ring by restraining means which permit the hubs to assume a range of angles of misalignment, if the pipe sections are not aligned.

In addition, in some forms, the preloading of the seal between the hubs can be simply accomplished, even under water by application of a loading tool to the hubs or to the restraining means for the hubs, to preload or energize the seal ring before the constraining means are locked against axial separation of the hubs. In a subsea environment, such a structure eliminates the need for a diver or manipulator to employ tools for making up the restraining means to load the seal ring and the hubs together. After the constraining means are made up, the loading tool can be removed for future use.

Further the invention provides means for simplifying the make up of a misalignment connector in the subsea environment or other environment where the connector is at such an angle that it is difficult to locate or position and retain the metalic seal ring in position relative to one connector hub for proper engagement and loading of the seal ring between the opposed hubs. The seal ring retainer is constructed in such a manner as to permit the seal ring and hubs to be properly loaded together over the permitted range of angular misalignment. Such a structure is particularly benfecial when the connector is being made up in a subsea environment, since manual maintenance of the seal ring in an initial position relative to one of the hubs, while the other hub is moved into position, is difficult and hazardous.

In accomplishing the foregoing, the present invention contemplates a connector wherein a pair of connector hubs have internal spherical surfaces engaged with the external spherical surface of an internal, metal seal ring which is held preloaded or energized by restraining means which include integral portions of the hubs and holding elements which have additional spherical surfaces enabling angular misalignment of the hubs. In some forms the hubs are symmetrical and the total angle of misalignment is distributed equally between the hubs. In other forms, the angular misalignment is accommodated in one hub, but the overall diameter is nevertheless small. In the case of certain of both forms, just referred to, the connector can be preloaded by a loading tool applicable to thrust shoulders provided on the parts before make up of the restraining means.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention, but it is to be understood that such detailed description is not to be taken in a limiting sense.

Referring to the drawings:

FIG. 1 is a perspective showing a misalignment connector and a loading tool applied thereto;

FIG. 2 is a longitudinal section, as taken on the line 2—2 of FIG. 1, with parts of the loading tool removed for clarity, showing one form of the connector assembly prior to preloading of the seal ring;

FIG. 3 is a longitudinal quarter section showing the connector parts restrained together;

FIG. 4 is a view corresponding to FIG. 3 but showing another form of the connector;

FIG. 5 is a view corresponding to FIG. 3 but showing another form of the connector;

FIG. 5a is an enlarged detail of the circled structure 5a of FIG. 5, and

FIG. 6 is a view corresponding to FIG. 3 but showing another form of the connector.

As seen in the drawings, a pipe connector C, made in accordance with the invention, comprises a pair of complemental connector body parts 1 and 2, in the form shown in FIGS. 1 through 3, comprising a pair of connector flanges, constrained together by circumferentially spaced screws 3 having nuts 4 threaded thereon at opposite ends thereof and engaged with the flanges in a manner more particularly described below, the screws extending through the flanges and holding them against separation. Within and integral with the flanges are a pair of connector hubs 6 and 7, adapted to be moved axially towards one another by the flanges 1 and 2 as the connector is being made up. The connector hub 5 is joined to a length of pipe 8 by a circumferentially continuous weld 9, and the connector hub 7 is joined to another section of pipe 10 by a circumferentially continuous weld 11. The connector hub 6 includes a cylindrical body section 12 formed with an outwardly flaring hub end 17. This hub end 17 has an internal spherical surface 19 engageable with the external spherical surface 20 at one side of a metal sealing ring 21.

Correspondingly, in this form, the connector hub part 7 has a cylindrical body 22 provided with an outwardly flared hub end 23, this hub end having an internal spherical surface 25 engageable with the external spherical surface 20 of the metal sealing ring 21.

When the flanges 1 and 2 and the hubs 6 and 7 move towards one another, the outer peripheral, spherical surface 20 of the metal seal ring 21 is engaged between the internal spherical surfaces 19 and 25 of the respective hub ends 17 and 23, so as to axially and circumferentially energize or preload the metallic sealing ring and provide a tight metal-to-metal sealing contact between the opposing spherical surfaces of the sealing ring and the hub ends.

A resilient back up seal for the metal-to-metal seal between the respective hubs and the metal sealing ring is provided. An elastomeric sealing ring 27 is disposed between the hub end 17 and the metal sealing ring 21, the elastomeric sealing ring being carried in a circumferentially extended groove 28 provided about the outer periphery of the metal sealing ring 21. An additional elastomeric sealing ring 29 is disposed between the outer spherical surface 20 of the seal ring 21 and the inner spherical surface 25 of the hub end 23 and is disposed in a circumferentially extended groove 30 provided in the outer periphery of the seal ring 21. When the connection is made up, the pressure of fluid within the passage 31, which extends through the connector within the inner passage 31, which extends through the connector within the inner periphery of the seal ring 21, can act on the seal ring 21 to pressure load the metal-to-metal sealing surfaces into tight sealing engagement and the elastomeric seal assures the sealing effectiveness.

It is apparent that while the hubs 6 and 7 are shown in axial alignment with one another, the spherical shape of the inner surfaces of the hub ends 17 and 23 and the spherical outer shape of the seal ring 21 enable the connector hubs 6 and 7 to be disposed at a range of angles of misalignment Means are provided for restraining the hubs 6 and 7 against separation over the range of angular misalignment. In accordance with the present invention the restraining means comprise additional spherical surfaces enabling the angular misalignment, including spherical seats 1a and 2a ond the respective flanges 1 and 2 receiving companion spherical surfaces 4a and 4b on the nuts 4 at opposite ends of the screws 3. The flanges 1 and 2 have enlarged bores 1b and 2b and counterbores 1c and 2c affording adequate clearance space for the screws, permitting angular misalignment of the hubs 6 and 7, and the nuts 4 engaging in the spherical seats throughout the range of angular movement. The flanges 1 and 2 are of similar or symmetrical design and each flange can accommodate one-half of the total range of angular misalignment, which is limited in a manner described below.

This range of angular misalignment of the connector is accomplished in a structure which is relatively small in diameter as compared with a typical ball and socket connector wherein the total range of angular adjustment is accomplished by the use of a spherical ball surface engaging in a spherical socket and wherein the sealing diameter is accordingly relatively large.

During the making up of misalignment connectors in difficult environments, such as a subsea environment, where typically the tightening of the nuts and screws 3 and 4, which are spaced circumferentially about the flanges 1 and 2, must be accomplished by divers or by manipulative devices provided by diving bells, the effective loading of the hub flanges 1 and 2 together, so as to properly preload the internal metallic sealing ring into metal-to-metal sealing engagement with the internal spherical surfaces of the hubs, becomes very difficult. Not only are the tools for performing such tasks unwieldy in the hands of the divers or by manipulators, but the tightening of the fastenings must be accomplished in some sort of circumferential sequence, namely tightening the fastening successively about the flanges, and then progressively retightening the fastenings until the flanges are properly loaded.

The present invention, in the form now being described, simplifies the operation of making up the connector C. In this connection, the hub 6 has a thrust ring 36 threaded or otherwise provided thereon and forming a thrust shoulder or a face 37 which is spherical. Correspondingly, the connector hub 7 has a thrust ring 38 threaded thereon and forming a thrust shoulder or surface 39 which is spherical. As seen in FIG. 1, a loading tool T is applicable to the opposite spherical thrust ring surfaces 37 and 39 and is adapted to apply an axial force to the respective hubs urging them towards one another and into engagement with the internal seal ring 21.

In the illustrative form, the tool T comprises thrust transmitting means engageable with the respective thrust rings 36 and 38. The tool includes a first radially split ring 40, composed of ring half parts hingedly interconnected at 41 and adapted to be clamped together by suitable clamping means such as bolt 42 extending through outstanding ears 43 on the respective ring half parts. A second thrust transmitting, radially split ring 44 is hingedly interconnected at 45, at one side of the ring half parts, and clamped together at the opposite side by a bolt 46 extending through outstanding ears 47 on the respective split ring parts. Extending between the split rings 40 and 44 are a suitable number of circumferentially spaced hydraulic actuator cylinders 48 having rods 49 projecting therefrom, the cylinders being connected at 50 to one of the split rings and the rods being connected at 51 to the other split ring, whereby the application of hydraulic fluid to the cylinders to retract the rods into the cylinders will apply opposite axial forces to the thrust rings 40 and 44, as indicated by the arrows 37a and 39a in FIG. 2. Suitable hydraulic lines 52 connect the cylinders 48 with a source line 53 to which hydraulic fluid can be supplied from a suitable source, say at a location on the vessel afloat in the water, or from some suitable hand operated pump beneath the sea.

As seen in FIG. 2, the opposing inner sides of the respective split thrust rings 40 and 44 have spherical loading surfaces 37b and 39b engageable with the companion spherical thrust surfaces 37 and 39 on the hubs 6 and 7, whereby the thrust rings 40 and 44 can engage misaligned connector hubs and draw them towards one another. The connecting screws 3 can be initially loosely installed when the flanges are drawn towards one another and then finally tightened after the confronting spherical surfaces of the metallic seal ring 21 and the opposing hub ends 17 and 23 are moved into engagement and progressively the sealing ring is axially and circumferentially radially energized or loaded to cause a tight metal-to-metal seal between the metallic seal ring and the inner surfaces of the hub ends.

Initial proper positioning of the seal ring 21 with respect to one of the hub ends of the connector, while the other hub end is being moved into engagement with the seal ring is difficult to accomplish in any situation in which the seal ring will not rest within the sperical surface of the hub end by gravity, but the problem is accentuated when the connector is to be made up in a subsea environment. Accordingly, as seen in FIG. 2, retaining means R are provided for initially supporting the seal ring 21 in a position with its peripheral spherical surface 20 in or nearly in engagement with the companion inner spherical surface 25 of the hub end 23. This retaining means is constructed so that the seal ring can be properly engaged by the other hub end 17 throughout the range of permitted angular misalignment of the hub ends and so that the seal ring can partake of the necessary relative angular and axial motion necessary for the proper preloading or energization of the seal ring 21. Accordingly, in the form of FIG. 3, the seal ring 21 has a radial support flange 54 projecting outwardly therefrom. The flange 54 may be segmented or may comprise a number of circumferentially spaced projections providing clearance space for the screws 3, but in any event the flange provides a support to which a plurality of circumferentially spaced supporting members 55 are attached by a fastener screw 56, the members being connected by fasteners 57 to the end face of the hub end 23. The support member 55 may be of any suitable construction, but is preferably constructed in accordance with my application for U.S. patent filed concurrently herewith, Ser. No. 823,919, filed Aug. 12, 1977, whereby the seal ring 21 is flexibly supported to enable it to partake of the necessary axial and/or angular motion previously referred to. It will also be noted that the flange 54 has opposite side faces 54a and 54b confronting end faces 17a and 23a of the hubs 17 and 23. Thus, angular misalignment of either hub will cause its end face to engage a side face of the flange 54 to cause angular movement of the seal ring with respect to the other hub. When the opposing faces 17a, 54a, 23a, and 54b are all in engagement they provide a stop or a limit to the maximum permissible angularity of the connector.

Referring to the connector structure illustrated in FIG. 4, the form of the flanges 1 and 2 with the integral hubs 6 and 7, and the construction of the retainer means or double-ended screws 3 and nuts 4 which allow for the making up of the connection over a range of misalignment, are the same as the construction previously described in connection with FIG. 3. However, it will be noted that the cylindrical sections 12 and 22 of the hubs 6 and 7 in FIG. 4, which are connected to the respective pipe ends, do not have the thrust rings attached thereto, as in the case of the previously described embodiment. Instead, in this form, the tool T is constructed in such a manner that it is applicable to the connector to engage the flange portions 1 and 2 and force them together over a range of angular misalignment. More particularly, the respective tool thrust rings 40 and 44 are provided at angularly spaced locations with projections or bosses 40a and 44a which are provided with spherical end surfaces 40b and 44b, respectively, engageable with the confronting opposite spherical faces 1a on the flange 1 and 2a on the flange 2, whereby the connector parts can be loaded towards one another upon the application of pressure fluid to the actuator cylinders 48. Thus, the flanges 1 and 2 can be preloaded into sealing engagement with the internal metal seal ring 21 and the retaining screws and nuts 4 applied in the spherical seats 1a and 2a which are circumferentially spaced and intermediate the spherical seats engaged by the thrust ring projections 40a and 44a. Thereafter, after removal of the preloading tool T the remaining retainer screws 3 and nuts 4 can be installed and tightly made up. In addition, it will be noted that in the event the connector is to be made up in a convenient location, the retaining screws and nuts 4 can be utilized to effect the preloading or energization of the seal ring 21.

As seen in FIGS. 5 and 6 of the drawings, a pipe connector C, made in accordance with the invention, comprises a pair of complemental connector body parts 101 and 102, comprising a pair of connector flanges, constrained together by circumferentially spaced screws 103 having nuts 104 threaded thereon at opposite ends thereof and engaged with the flanges in a manner more particularly described below, the screws extending through the flanges and holding them against separation. Within and integral with the flanges are a pair of connector hubs 106 and 107, adapted to be moved axially towards one another by the flanges 101 and 102 as the connector is being made up. The connector hub 106 is joined to a length of pipe 108 by a circumferentially continuous weld 109, and the connector hub 107 is joined to another section of pipe 110 by a circumferentially continuous weld 111. The connector hub 106 includes a cylindrical body section 112 formed with an outwardly flaring hub end 117. This hub end 117 has an internal spherical surface 119 engageable with the external spherical surface 120 at one side of a metal seal ring 121.

Correspondingly, in these forms, the connector hub part 107 has a cylindrical body 122 provided with an outwardly flared hub end 123, this hub end having an internal spherical surface 125 engageable with the external spherical surface 120 at the other side of the metal sealing ring 121.

When the flanges 101 and 102 and the hubs 106 and 107 move towards one another, the outer peripheral, spherical surface 120 of the metal seal ring 121 is engaged between the internal spherical surfaces 119 and 125 of the respective hub ends 117 and 123, so as to axially and circumferentially energize or preload the metallic sealing ring and provide a tight metal-to-metal sealing contact between the opposing spherical surfaces of the sealing ring and the hub ends.

A resilient back up seal for the metal-to-metal seal between the respective hubs and the metal sealing ring is provided. An elastomeric sealing ring 127 is disposed between the hub end 117 and the metal sealing ring 121, the elastomeric sealing ring being carried in a circumferentially extended groove 128 provided about the outer periphery of the metal sealing ring 121. An additional elastomeric sealing ring 129 is disposed between the outer spherical surface 120 of the seal ring 121 and the inner spherical surface 125 of the hub end 123 and is disposed in a circumferentially extended groove 130 provided in the outer periphery of the seal ring 121. When the connection is made up, the pressure of fluid within the passage 131, which extends through the connector within the inner passage 131, which extends through the connector within the inner periphery of the seal ring 121, can act on the seal ring 121 to pressure load the metal-to-metal sealing surfaces into tight sealing engagement and the elastomeric seal assures the sealing effectiveness.

It is apparent that while the hubs 106 and 107 are shown in axial alignment with one another, the spherical shape of the inner surfaces of the hub ends 117 and 123 and the spherical outer shape of the seal ring 121 enable the connector hubs 106 and 107 to be disposed at a range of angles of misalignment.

Means are provided for restraining the hubs 106 and 107 against separation over the range of angular misalignment. In accordance with the present invention the restraining means comprise additional spherical surfaces enabling the angular misalignment, including spherical seats 101a and 102a on the respective flanges 101 and 102 receiving companion spherical surfaces 104a and 104b on the nuts 104 at opposite ends of the screws 103. The flanges 101 and 102 have enlarged bores 101b and 102b and counterbores 101c and 102c affording adequate clearance space for the screws, permitting angular misalignment of the hubs 106 and 107, and the nuts 104 engaging in the spherical seats throughout the range of angular movement. The flanges 101 and 102 are of dissimilar or asymmetrical design and the flange 101 can accommodate the total range of angular misalignment, which is limited upon coengagement of the radial end face 101d on the flange 101 with the opposed angular, inclined face 102d on the flange 102.

In order to enable the loading of the connector flanges 101 and 102 towards one another and the initial preloading or energization of the seal ring 121, the structure of FIG. 5 provides a thrust ring 136 threaded or otherwise connected or formed on the tubular section 112 of the hub 106 and providing a thrust shoulder or surface 137 which is spherical. Correspondingly, the connector hub 107 has a thrust ring 138 threaded or otherwise provided on the tubular section 122 and providing a thrust shoulder or surface 139 which is spherical. A loading tool such as the tool T previously described is applicable to the opposite spherical thrust ring surfaces 137 and 139 and is adapted to apply the axial force to the respective hubs urging them towards one another and into engagement with the internal seal ring 121. With the flanges loaded towards one another, the retainer screws 103 and nuts 104 can be easily applied, even in a difficult environment, over the full ranges of angles of misalignment of the connector.

In accordance with the embodiments of the invention of FIGS. 5 and 6, the internal seal ring 121 is initially held in place with respect to the hub 107 and the outer spherical surface 120 thereof in or nearly in engagement with the internal spherical surface 125 provided by the hub 107, for proper preloading and energization axially and circumferentially between the opposing hub surfaces 119 and 125. The hub 107 has an internal axially extended skirt 156 spaced circumferentially inwardly from the spherical surface 125 of the hub 107 and providing an external cylindrical surface 157 adapted to received the inner periphery of the sealing ring 121. The seal ring 121 is retained upon the skirt 156 by means including a suitable radially split retainer ring 158 which is disposed in a radial groove 159 in the inner periphery of the seal ring 121. This retainer ring 158 is initially retracted when the seal ring 121 is placed upon the skirt 156, and then the retainer ring 158 is moved radially inwardly into the groove 162 on the skirt 156 to latch the seal ring 121 to the flange 101. To release, screws 160 are installed in the radially threaded holes 161 adjacent the end of the skirt to force the retainer ring 158 into groove 159 of seal ring 121 so the seal ring 121 is free to come off skirt 156. The skirt surface 157 is sufficiently smaller in outside diameter than the inside diameter of the seal ring 121 to enable adequate freedom of motion of the seal ring 121 as it is being circumferentially inwardly preloaded. In addition, the pins 158 have sufficient axial clearance in the outer portions 162 of the threaded bores 161 to enable sufficient axial movement of the seal ring 121 with respect to the supporting skirt 156 during preloading of the seal ring 121.

Referring more specifically to FIG. 6, wherein the same reference characters employed in FIG. 5 are applied to the corresponding parts, it will be noted that the connector structure is substantially identical to that of FIG. 5, except that the tubular hub portions 112 and 122 which are connected to the pipe ends are shortened, and if preloading of the connector of FIG. 6 with a tool such as the tool T shown in FIG. 4 is desired, then the tool can be applied to the alternate or certain of the circumferentially spaced spherical seats 101a and 102a of the flanges 101 and 102 to load the connector parts together. Thereafter, the retainer screws 103 and nuts 104 can be installed in the flanges as previously described to retain the connector in a preloaded condition when the tool is removed. Thereafter, the remaining retainers or fasteners 103 and 104 can be applied to the connector.

From the foregoing it will now be apparent that the present invention provides a misalignment connector for pipelines or conductor pipes wherein the internal metal seal ring has its external spherical surface initially axially and circumferentially loaded between the opposed internal spherical metal surfaces of the connector hub in an effective manner, the hubs being capable of initial preloading by the application of a preloading tool thereto, whereby the retention of the connector parts in positions energizing the seal ring is facilitated, even in a hostile environment such as the subsea pipeline or other installation. In addition, the metal seal ring is initially supported on one of the hubs in such a manner that its proper coengagement between the spherical surfaces of the hubs is assured in a manner rendering the making up of the connectors safe and easy.

I claim:

1. A misalignment connector comprising: a pair of metal connector hubs defining a fluid passage and having opposed spherical surfaces circumscribing said passage; a metal seal ring having an external spherical surface engaged between said spherical surfaces of said hubs and axially and circumferentially preloaded thereby; means engageable by a preloading tool for initially loading said spherical hub and ring surfaces togther; and restraining means applicable to said hubs while said sealing ring is preloaded by said loading tool for holding said hubs together with said spherical surfaces of said hubs and said sealing ring in metal-to-metal sealing engagement and with said sealing ring axially and circumferentially inwardly loaded upon removal of said loading tool; said restraining means having additional spherical surfaces coengaged to prevent relaxation of said seal ring over a range of angular misalignment of said hubs including members projecting outwardly from said hubs and holding means preventing separation of said members, said additional spherical surfaces being on said members and said holding means.

2. A misalignment connector as defined in claim 1; including thrust means on said hubs engageable by said preloading tool for initially loading said spherical hub and ring surfaces together.

3. A misalignment connector as defined in claim 1; including thrust means on said hubs engageable by said preloading tool for initially loading said spherical hub and ring surfaces together, said thrust means being rings on said hubs having oppositely facing spherical thrust surfaces engageable by said tool.

4. A misalignment connector as defined in claim 1; said sealing ring and one of said hubs having retainer means shiftably mounting said sealing ring on said one of said hubs for axial and circumferential loading of said seal ring between said spherical surfaces of said hubs.

5. A misalignment connector as defined in claim 1; said sealing ring and one of said hubs having retainer means shiftably mounting said sealing ring on said one of said hubs for axial and circumferential loading of said seal ring between said spherical surfaces of said hubs, said retainer means comprising flexible means between the outer periphery of said sealing ring and one of said hubs.

6. A misalignment connector as defined in claim 1; said sealing ring and one of said hubs having retainer means shiftably mounting said sealing ring on said one of said hubs for axial and circumferential loading of said seal ring between said spherical surfaces of said hubs, said retainer means comprising a connector between one of said hubs and the inner periphery of said sealing ring.

7. A misalignment connector as defined in claim 1; including a loading tool engaged with said members for initially loading said spherical hub and ring surfaces together.

8. A misalignment connector as defined in claim 1; including a loading tool having spherical portions engaging certain of said spherical surfaces of said members for initially loading said spherical hub and ring surfaces together, said holding means engaging certain other of said spherical surfaces of said members.

9. A misalignment connector as defined in claim 1; including thrust means on said hubs engageable by said preloading tool for initially loading said spherical hub and ring surfaces together, and a loading tool engaged with said thrust means for initially loading said spherical hub and ring surfaces together.

10. A misalignment connector as defined in claim 1; including resilient back up sealing means between said spherical surfaces of said hubs and said sealing ring.

11. A misalignment connector comprising: a pair of metal connector hubs defining a fluid passage and having internal, opposed spherical surfaces circumscribing said passage; a metal seal ring having an external spherical surface engaged and axially and circumferentially loaded between said spherical surfaces of said hubs; said hubs having outwardly projecting members having circumferentially spaced aligned bores; oppositely facing thrust surfaces on said hubs engageable by a loading tool for forcing said hubs together and loading said seal ring between said internal spherical surfaces of said hubs; retainer screws extending through said bores; holding members applicable to said screws while said seal ring is loaded by said tool to maintain said seal ring loaded; said hub members and said holding members having co-engaged surfaces enabling angular misalignment of said hubs.

12. A misalignment connector as defined in claim 11; said hub members having spherical seats forming one of said coengaged surfaces, said holding members having spherical surfaces forming the other of said coengaged surfaces.

13. A misalignment connector as defined in claim 11; including circumferentially spaced retainer means between said screws connecting said seal ring to one of said hubs and initially supporting said seal ring for angular adjustment between said internal spherical surfaces of said hubs.

14. A misalignment connector as defined in claim 13; said retainer means including a support member projecting outwardly from said seal ring and a flexible link between said support member and said one of said hubs.

15. A misalignment connector as defined in claim 13; said retainer means including a support member projecting outwardly from said seal ring and a flexible link between said support member and said one of said hubs, said support member and said hubs having confronting surfaces engageable to limit relative angular movement of said hubs relative to said seal ring.

16. A misalignment connector comprising: a pair of metal connector hubs defining a fluid passage and having internal, opposed spherical surfaces circumscribing said passage; a metal seal ring having an external spherical surface engaged between said spherical surfaces of said hubs; said hubs having outwardly projecting members having circumferentially spaced aligned bores; retainer screws extending through said bores; and holding members on said screws; said hub members and said holding members having co-engaged surfaces enabling angular misalignment of said hubs; including retainer means between one of said hubs and the inner periphery of said seal ring initially supporting said seal ring on said one of said hubs for angular movement of the other of said hubs relative to said one of said hubs and movement of said seal ring during loading thereof between said inner spherical surfaces of said hubs.

17. A misalignment connector as defined in claim 16; said retainer means including an axial projection on said one of said hubs extending within the inner periphery of said seal ring, and means shiftably connecting said seal ring to said projection.

18. A misalignment connector as defined in claim 16; said retainer means including an axial projection on said one of said hubs extending within the inner periphery of said seal ring, and means shiftably connecting said seal ring to said projection, including circumferentially spaced connector means removably mounting said seal ring on said projection and for relative axial and circumferential loading of said seal ring.

* * * * *